United States Patent
Fukaya et al.

(10) Patent No.: US 8,282,718 B2
(45) Date of Patent: Oct. 9, 2012

(54) SURFACE TREATMENT SOLUTION, INK SET, INK-JET RECORDING METHOD, AND INK-JET RECORDING APPARATUS

(75) Inventors: Hideji Fukaya, Nisshin (JP); Ryuji Kato, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 375 days.

(21) Appl. No.: 12/728,851

(22) Filed: Mar. 22, 2010

(65) Prior Publication Data

US 2010/0330281 A1    Dec. 30, 2010

(30) Foreign Application Priority Data

Jun. 30, 2009 (JP) ................................. 2009-156028

(51) Int. Cl.
C09D 11/00 (2006.01)

(52) U.S. Cl. ................ 106/31.24; 106/31.68; 106/31.86

(58) Field of Classification Search ............... 106/31.86, 106/31.68, 31.24
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 6,096,418 A | 8/2000 | Sato et al. | |
| 2007/0279445 A1 | 12/2007 | Yamashita | |

FOREIGN PATENT DOCUMENTS

| | | |
|---|---|---|
| JP | 64-063185 | 3/1989 |
| JP | H06-247035 A | 9/1994 |
| JP | 08-003498 | 1/1996 |
| JP | H10-297078 A | 11/1998 |
| JP | H11-208096 A | 8/1999 |
| JP | 2000-103999 | 4/2000 |
| JP | 2000-513396 | 10/2000 |
| JP | 2007-326242 | 12/2007 |
| JP | 2009-133057 A | 6/2009 |

OTHER PUBLICATIONS

JP Decision to Grant a Patent dated Aug. 23, 2011, corresponding Application No. 2009-156028; English Translation.

*Primary Examiner* — Melvin C Mayes
*Assistant Examiner* — Veronica F Faison
(74) *Attorney, Agent, or Firm* — Banner & Witcoff, Ltd

(57) ABSTRACT

A surface treatment solution for a recording paper on which ink-jet recording is performed with a water-based ink, the surface treatment solution includes calcium alginate which is contained by 0.008 wt % to 0.074 wt % in the surface treatment solution, sodium alginate which is contained by 0.013 wt % to 0.084 wt % in the surface treatment solution, a water-soluble organic solvent, and water.

18 Claims, 8 Drawing Sheets

SURFACE TREATMENT SOLUTION, INK SET, INK-JET RECORDING METHOD, AND INK-JET RECORDING APPARATUS

CROSS REFERENCE TO RELATED APPLICATION

The present application claims priority from Japanese Patent Application No. 2009-156028, filed on Jun. 30, 2009, the disclosure of which is incorporated herein by reference in its entirety.

BACKGROUND OF THE INVENTION

1. Field of the Invention

The present invention relates to a surface treatment solution for a recording paper for performing the ink jet recording with a water-based ink, an ink set, an ink-jet recording method, and an ink jet recording apparatus.

2. Description of the Related Art

As the high speed is realized for the recording speed of the ink-jet recording apparatus, the quick drying performance (property) of the water-based ink is required when the water-based ink is applied to the recording paper. The following ink jet recording method has been suggested as a method for dissolving the problem of the quick drying performance. That is, a pretreatment solution, which contains a compound to make a dye insoluble, is adhered to the recording paper, and then a water-based ink is adhered to the recording paper.

However, in the case of the method described above, the improvement in the quick drying performance is limited to the case in which the dye ink is used. Further, it is necessary to select the compound which makes the dye contained in the dye ink to be insoluble.

SUMMARY OF THE INVENTION

In view of the above, an object of the present invention is to provide a surface treatment solution (liquid) which makes it possible to improve the quick drying performance of a water-based ink with respect to the recording paper.

According to first aspect of the present invention, there is provided a surface treatment solution for a recording paper on which ink jet recording is performed with a water-based ink, the surface treatment solution including; calcium alginate which is contained by 0.008 wt % to 0.074 wt % in the surface treatment solution, sodium alginate which is contained by 0.013 wt % to 0.084 wt % in the surface treatment solution, a water-soluble organic solvent, and water.

According to a second aspect of the present invention, there is provided an ink set including: a water-based ink which is subjected to ink-jet recording on a recording paper; and a surface treatment solution which is applied to the recording paper, wherein the surface treatment solution contains; calcium alginate which is contained by 0.008 wt % to 0.074 wt % in the surface treatment solution, sodium alginate which is contained by 0.013 wt % to 0.084 wt % in the surface treatment solution, a water-soluble organic solvent, and water.

According to a third aspect of the present invention, there is provided an ink-jet recording method including: applying a surface treatment solution to a recording paper to be subjected to ink jet recording with a water-based ink; and discharging the water-based ink to the recording paper in accordance with an ink-jet system, wherein the applying uses, as the surface treatment solution, a surface treatment solution which contains; calcium alginate which is contained by 0.008 wt % to 0.074 wt % in the surface treatment solution, sodium alginate which is contained by 0.013 wt % to 0.084 wt % in the surface treatment solution, a water-soluble organic solvent, and water.

According to a fourth aspect of the present invention, there is provided an ink-jet recording apparatus including: an ink accommodating section which accommodates an water-based ink; a head which discharges the water-based ink to a recording paper; a surface treatment solution accommodating section which accommodates a surface treatment solution for the recording paper; and an applying mechanism which applies the surface treatment solution to the recording paper, wherein the surface treatment solution is the surface treatment solution of the first aspect of the present invention.

DESCRIPTION OF THE PREFERRED EMBODIMENTS

Figure 1:
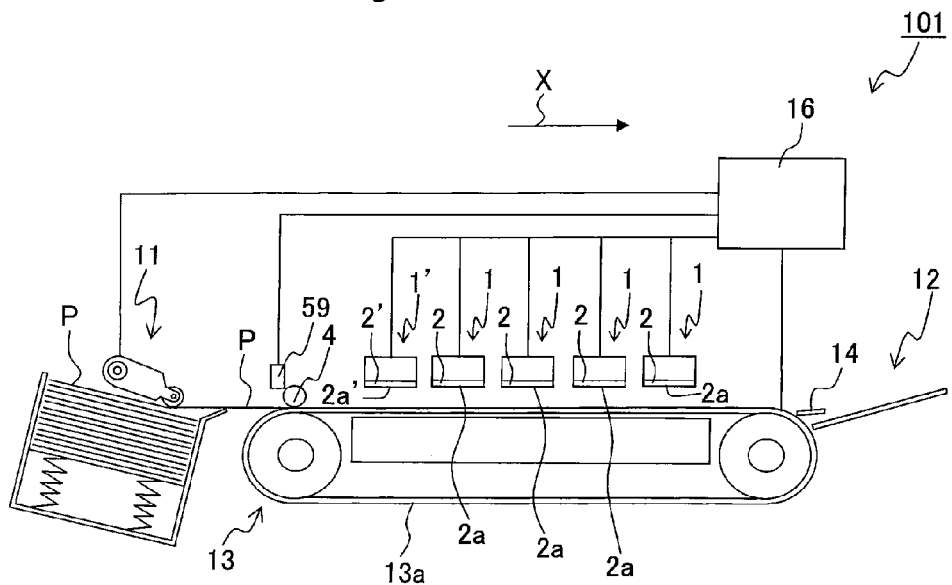
FIG. 1 shows an arrangement illustrating an exemplary structure of an ink-jet recording apparatus in relation to a third embodiment.

An explanation will be made about a surface treatment solution for the recording paper for performing the ink jet recording with the water-based ink as a first embodiment. Preferably, the surface treatment solution of this embodiment is applied to the recording paper prior to the ink-jet recording. More preferably, the surface treatment solution of this embodiment is used when the ink-jet recording is performed (when the printing is performed).

The recording paper is not specifically limited, for which any conventionally known recording paper is usable. Specifically, for example, the so-called plain paper (a plain paper), which is commercially available in general, is preferably used, including, for example, the copy paper and the bond paper. Further, for example, the mat paper and the glossy paper, which are commercially available in general, are also usable. In this specification, the term "plain paper" means a paper (sheet) having no coating layer on a surface, i.e., the paper (sheet) on which the paper fibers are exposed to the surface layer. In general, the plain paper is inferior in the quick drying performance of the water-based ink. However, the surface treatment solution of this embodiment can greatly improve the quick drying performance of the plain paper.

The surface treatment solution of this embodiment contains calcium alginate, sodium alginate, the water-soluble organic solvent, and water.

Calcium alginate has the function to improve the quick drying performance of the water-based ink with respect to the recording paper. The blending amount of calcium alginate is 0.008% by weight (wt %) to 0.074% by weight (wt %) with respect to the total amount of the surface treatment solution. When the blending amount of calcium alginate is not less than 0.008% by weight, it is possible to improve the quick drying performance of the water-based ink with respect to the recording paper. Calcium alginate is hardly (scarcely or slightly) soluble in water. However, when sodium alginate is added as described later on, and the blending amount thereof is not more than 0.074% by weight, then the surface treatment solution, which is excellent in the dispersion performance (property) of calcium alginate, is obtained. It is preferable that the blending amount of calcium alginate is 0.04% by weight to 0.064% by weight with respect to the total amount of the surface treatment solution.

Sodium alginate principally has the function to improve the dispersion performance of calcium alginate which is hardly (scarcely or slightly) soluble in water. Further, sodium alginate itself also has the function to improve the quick drying performance of the water-based ink with respect to the recording paper. The blending amount of sodium alginate is 0.013% by weight to 0.084% by weight with respect to the total amount of the surface treatment solution. When the blending amount of sodium alginate is not less than 0.013% by weight, the surface treatment solution, which is excellent in the dispersion performance of calcium alginate, is obtained. The improvement in the dispersion performance of calcium alginate, which is brought about by using sodium alginate together, is firstly found out by the present inventors. Sodium alginate exhibits a high viscosity when sodium alginate is dissolved in water. However, when the blending amount of sodium alginate is not more than 0.084% by weight, then the viscosity of the surface treatment solution can be made appropriate, and it is possible to improve the quick drying performance of the water-based ink with respect to the recording paper.

Those preferably usable as the water-soluble organic solvent include dipropylene glycol n-propyl ether (DPP), diethylene glycol n-hexyl ether (DEHE), and triethylene glycol n-butyl ether (BTG). Those other than DPP, DEHE, and BTG described above are also usable as the water-soluble organic solvent. The water-soluble organic solvents other than DPP, DEHE, and BTG described above include, for example, polyvalent alcohols such as glycerol, ethylene glycol, diethylene glycol, propylene glycol, butylene glycol, triethylene glycol, polyethylene glycol, trimethylolpropane, 1,5-pentanediol, and 1,2,6-hexanetriol; polyvalent alcohol derivatives such as ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, triethylene glycol methyl ether, triethylene glycol ethyl ether, triethylene glycol n-propyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-butyl ether, tripropylene glycol methyl ether, tripropylene glycol ethyl ether, tripropylene glycol n-propyl ether, and tripropylene glycol n-butyl ether; alcohols such as ethanol, isopropyl alcohol, n-butyl alcohol, isobutyl alcohol, and benzyl alcohol; amides such as dimethylformamide and dimethylacetamide; ketones such as acetone; ethers such as tetrahydrofuran and dioxane; nitrogen-containing solvents such as pyrrolidone, N-methyl-2-pyrrolidone, cyclohexyl pyrrolidone, and triethanolamine; sulfur-containing solvents such as thiodiethanol, thiodiglycerol, sulforan, and dimethylsulfoxide; propylene carbonate; and ethylene carbonate. The blending amount of the water-soluble organic solvent is, for example, 1% by weight to 15% by weight and preferably 2% by weight to 10% by weight with respect to the total amount of the surface treatment solution. One type of the water-soluble organic solvent as described above may be used singly. Alternatively, two or more types of the water-soluble organic solvents as described above may be used in combination.

Water is preferably ion-exchanged water or pure water. The blending amount of water with respect to the total amount of the surface treatment solution may be, for example, the balance of the other components.

The surface treatment solution of this embodiment may contain any other component in addition to calcium alginate, sodium alginate, the water-soluble organic solvent, and water.

When the surface treatment solution is applied to the recording surface of the recording paper as described above, the quick drying performance of the water-based ink is improved with respect to the recording paper. The present inventors speculate as follows about the mechanism of the improvement in the quick drying performance. When the recording is performed with the water-based ink without applying the surface treatment solution, then the water-based ink is not permeated into the recording paper, and the water-based ink remains or stays on the recording surface of the recording paper in some cases, wherein the quick drying performance of the water-based ink causes any problem. On the other hand, the quick drying performance of the water-based ink with respect to the recording paper is generally improved by enhancing the permeability of the water-based ink into the recording paper. However, if the permeability of the water-based ink is enhanced, a problem arises such that the optical density of the recorded matter is lowered. In this way, the relationship between the quick drying performance of the recorded matter and the optical density is in a relationship of trade-off. On the contrary, when the surface treatment solution of this embodiment is applied to the recording paper, the water-based ink can be fixed at the position disposed in the vicinity of the recording surface inside the recording paper, not on the recording surface of the recording paper. The term "fixation" or "fix" herein includes the fact that the dye is made insoluble when the coloring agent contained in the water-based ink is the dye and the fact that the pigment coheres (coagulates) when the coloring agent is the pigment. The drying performance is improved, because the water-based ink does not stay or remain on the surface of the recording paper. The optical density of the recorded matter is not lowered, because the coloring agent is fixed at the position disposed in the vicinity of the recording surface of the recording paper.

The present inventors speculate that calcium alginate, which is contained in the surface treatment solution of this embodiment, functions to fix the ink as described above. When the surface treatment solution is applied to the surface of the recording paper, calcium alginate, which is contained in the surface treatment solution, stays in the vicinity of the recording surface inside the recording paper. Calcium alginate, which is contained in the surface treatment solution, has a constant (certain) molecular radius, and it exists as the hydrate. It is considered that the size of the calcium alginate molecule provides the optimum size to stay in the vicinity of the recording surface inside the recording paper. When the surface treatment solution is applied to the recording paper, and the recording is performed with the water-based ink on the applied area of the surface treatment solution, then the surface treatment solution and the water-based ink are brought in contact with each other in the recording paper. The water-based ink is fixed to the recording paper in a short period of time owing to the interaction of, for example, alginic acid which originates from calcium alginate and the coloring agent which is contained in the water-based ink. Further, when the coloring agent contains the pigment, the pigment, which is contained in the water-based ink, efficiently coheres in the vicinity of the recording surface owing to the action of calcium ion originating from calcium alginate. As a result, the water-based ink is quickly dried. The position of the fixation is disposed in the vicinity of the surface of the recording paper. Therefore, the optical density of the recorded matter is not lowered as well. As described above, according to the surface treatment solution of this embodiment, it is possible to establish both of the quick drying performance of the water-based ink with respect to the recording paper and the maintenance of the optical density of the recorded matter.

As described above, calcium alginate is not dissolved in water. Therefore, it is impossible to prepare any aqueous or water base surface treatment solution if calcium alginate is used as it is. However, the present inventors have found out the fact that calcium alginate can be dispersed in the aqueous or water base surface treatment solution by adding sodium alginate. Further, as for sodium alginate itself which is used as the dispersing agent, it has been found out that alginate ion and sodium ion, which originate therefrom, contribute to the fixation of the coloring agent to the recording paper as well.

The present inventors prepared surface treatment solutions for the recording paper in the same manner as described above by using other alginates including, for example, iron (II) alginate, strontium alginate, potassium alginate, magnesium alginate, copper alginate and aluminum alginate. However, any sufficient effect was not obtained. For example, the following causes are assumed. Any sufficient dispersion performance of these alginates was not obtained in the aqueous or water base surface treatment solution even when sodium alginate is added as the dispersing agent.

It is noted that the mechanism as described above is based on the speculation in every sense. This embodiment is neither restricted to nor limited by the speculation at all. In other words, the quick drying performance means the fact that the water-based ink is fixed to the recording paper in a short period of time after the recording, and the water-based ink is not transferred even if the water-based ink is brought in contact with, for example, any other member of the ink jet recording apparatus and the recording paper discharged to the paper discharge unit or section. The recording includes, for example, the letter printing, the image printing, and the print or printing.

Next, an ink set will be explained as a second embodiment. The ink set of this embodiment contains the water-based ink and the surface treatment solution for the recording paper of the first embodiment described above. The water-based ink is provided to perform the recording by discharging the water-based ink to the applied area of the surface treatment solution in accordance with the ink jet system.

The water-based ink is not specifically limited. For example, any conventionally known water-based ink, which is commercially available in general, can be used. The coloring agent, which is usable for the water-based ink, is not specifically limited, which may be any one of the pigment and the dye. However, as described above, it is preferable to contain the pigment. As for the coloring agent described above, it is also allowable to mix and use the pigment and the dye.

Those usable as the pigment include, for example, carbon black, inorganic pigments, and organic pigments. The carbon black includes, for example, furnace black, lamp black, acetylene black, and channel black. The inorganic pigment includes, for example, titanium oxide, inorganic pigments based on iron oxide, and inorganic pigments based on carbon black. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Any other pigment is also usable provided that the pigment is dispersible in the water phase. Specified examples of the pigments as described above include, for example, C. I. Pigment Blacks 1, 6, and 7; C. I. Pigment Yellows 1, 2, 3, 12, 13, 14, 15, 16, 17, 55, 73, 74, 75, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36.

The pigment may be any self-dispersible pigment. The self-dispersible pigment is dispersible in water without using any dispersing agent, for example, owing to the fact that at least one of the hydrophilic functional group and the salt thereof including, for example, carboxyl group, carbonyl group, hydroxyl group, and sulfon group is introduced into the surfaces of the pigment particles by the chemical bond directly or with any other group intervening therebetween.

As for the self-dispersible pigment, it is possible to use self-dispersible pigments subjected to the surface treatment by any one of methods described, for example, in Japanese Patent Application Laid-open No. 8-3498 and Japanese Patent Application Laid-open No. 2000-513396 (PCT). For example, any commercially available product may be used for the self-dispersible pigment. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Specialty Chemicals; "BONJET (trade name) BLACK CW-1", "BONJET (trade name) BLACK CW-2", and "BONJET (trade name) BLACK CW-3" produced by Orient Chemical Industries, Ltd.; and "LIOJET (trade name) WD BLACK 002C" produced by Toyo Ink Mfg. Co., Ltd.

As for the pigment which is usable as the raw material for the self-dispersible pigment, it is possible to use any one of inorganic pigments and organic pigments. The pigment, which is suitable to perform the surface treatment, includes, for example, carbon blacks such as "MA8" and "MA100" produced by Mitsubishi Chemical Corporation and "Color Black FW200" produced by Degussa.

The blending amount of the solid content of the pigment with respect to the total amount of the water-based ink (pigment ratio, pigment solid content amount) can be appropriately determined depending on, for example, the optical density and the coloration or colorfulness desired for the recorded matter. The pigment ratio is, for example, 0.1% by weight to 20% by weight and preferably 0.2% by weight to 15% by weight. One type of the pigment as described above may be used singly, or two or more types of the pigments as described above may be used in combination.

The dye is not specifically limited, which includes, for example, direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black includes, for example, C. I. Direct Blacks 17, 19, 32, 51, 71, 108, 146, 154, and 168. C. I. Direct Blue includes, for example, C. I. Direct Blues 6, 22, 25, 71, 86, 90, 106, and 199. C. I. Direct Red includes, for example, C. I. Direct Reds 1, 4, 17, 28, 83, and 227. C. I. Direct Yellow includes, for example, C. I. Direct Yellows 12, 24, 26, 86, 98, 132, 142, and 173. C. I. Direct Orange includes, for example, C. I. Direct Oranges 34, 39, 44, 46, and 60. C. I. Direct Violet includes, for example, C. I. Direct Violets 47 and 48. C. I. Direct Brown includes, for example, C. I. Direct Brown 109. C. I. Direct Green includes, for example, C. I. Direct Green 59. C. I. Acid Black includes, for example, C. I. Acid Blacks 2, 7, 24, 26, 31, 52, 63, 112, and 118. C. I. Acid Blue includes, for example, C. I. Acid Blues 9, 22, 40, 59, 93, 102, 104, 117, 120, 167, 229, and 234. C. I. Acid Red includes, for example, C. I. Acid Reds 1, 6, 32, 37, 51, 52, 80, 85, 87, 92, 94, 115, 180, 256, 289, 315, and 317. C. I. Acid Yellow includes, for example, C. I. Acid Yellows 11, 17, 23, 25, 29, 42, 61, and 71. C. I. Acid Orange includes, for example, C. I. Acid Oranges 7 and 19. C. I. Acid Violet includes, for example, C. I. Acid Violet 49. C. I. Basic Black includes, for example, C. I. Basic Black 2. C. I. Basic Blue includes, for example, C. I. Basic Blues 1, 3, 5, 7, 9, 24, 25, 26, 28, and 29. C. I. Basic Red includes, for example, C. I. Basic Reds 1, 2, 9, 12, 13, 14, and 37. C. I. Basic Violet includes, for example, C. I. Basic Violets 7, 14, and 27. C. I. Food Black includes, for example, C. I. Food Blacks 1 and 2.

The blending amount of the dye (dye ratio) with respect to the total amount of the water-based ink is not specifically limited, which is, for example, 0.1% by weight to 20% by weight, preferably 0.2% by weight to 8% by weight, and more preferably 0.2% by weight to 5% by weight. One type of the dye as described above may be used singly, or two or more types of the dyes as described above may be used in combination.

The water-based ink preferably contains a mixed solvent of water and the water-soluble organic solvent as the solvent in addition to the coloring agent.

Water is preferably ion-exchanged water or pure water. The blending ratio of water (water ratio) with respect to the total amount of the water-based ink is appropriately determined depending on, for example, the types and the composition of the water-soluble organic solvent and the desired ink characteristics. The water ratio may be, for example, the balance of the other components.

The water-soluble organic solvent includes, for example, a humectant which prevents the ink from being dried at the nozzle forward end portion of the ink-jet head, and a penetrant which adjusts the drying speed on the recording paper.

The humectant includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent alcohols such as polyalkylene glycols, alkylene glycols, and glycerol; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylene glycol, diethylene glycol, triethylene glycol, dipropylene glycol, tripropylene glycol, thiodiglycol, and hexylene glycol. One type of the humectant as described above may be used singly, or two or more types of the humectants as described above may be used in combination. In particular, it is preferable to use polyvalent alcohols such as alkylene glycol and glycerol.

The blending amount (humectant ratio) of the humectant with respect to the total amount of the water-based ink is, for example, 0% by weight to 95% by weight, preferably 5% by weight to 80% by weight, and more preferably 5% by weight to 50% by weight.

The penetrant includes, for example, glycol ether compounds. The glycol ether compound includes, for example, ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. One type of the penetrant as described above may be used singly, or two or more types of the penetrants as described above may be used in combination.

The blending amount (penetrant ratio) of the penetrant with respect to the total amount of the water-based ink is, for example, 0% by weight to 20% by weight. When the penetrant ratio is in the range described above, it is possible to obtain the more preferred permeability of the water-based ink into the recording paper. The penetrant ratio is preferably 0.1% by weight to 15% by weight and more preferably 0.5% by weight to 10% by weight.

The water-based ink may further contain conventionally known additives, if necessary. The additive includes, for example, surfactants, viscosity-adjusting agents, surface tension-adjusting agents, and fungicides. The viscosity-adjusting agent includes, for example, polyvinyl alcohol, cellulose, and water-soluble resin.

The water-based ink can be prepared, for example, such that the coloring agent, water, the water-soluble organic solvent, and optionally other additive components are mixed uniformly or homogeneously by any conventionally known method, and undissolved matters are removed by a filter or the like.

An ink jet recording apparatus will be explained as a third embodiment. The ink jet recording apparatus of this embodiment includes an ink accommodating section and an ink discharge mechanism (head), for discharging the ink accommodated in the ink accommodating section to the recording paper by the ink discharge mechanism, the ink jet recording apparatus further including a surface treatment solution accommodating section which accommodates the surface treatment solution for the recording paper and a mechanism which applies the surface treatment solution, wherein the surface treatment solution is the surface treatment solution of the first embodiment described above. The ink jet recording apparatus may be constructed in the same manner as any conventionally known ink-jet recording apparatus, for example, except for the surface treatment solution, the surface treatment solution accommodating section, and the mechanism for applying the surface treatment solution. The surface treatment solution may be accommodated in the ink accommodating section. In other words, the ink accommodating section and the surface treatment solution accommodating section may be integrated into one unit. Alternatively, any exclusive accommodating section or unit may be distinctly provided.

The ink-jet recording apparatus is preferably an ink-jet recording apparatus on which a line type ink-jet head is carried. However, the ink-jet recording apparatus is not limited thereto. The ink-jet recording apparatus may be, for example, an ink-jet recording apparatus on which a serial type ink-jet head is carried. The line type ink-jet recording apparatus is such an ink-jet recording apparatus that the line type ink-jet head, which has a recording width of not less than the width of the recording paper, is used to collectively perform the recording in the widthwise direction of the recording paper in a state in which the ink-jet head is fixed. On the contrary, in the case of the ink-jet recording apparatus of the serial type, the recording is performed while moving the ink-jet head itself in the widthwise direction of the recording surface of the recording paper. The recording speed of the line type ink-jet recording apparatus is remarkably faster than that of the serial type ink-jet recording apparatus.

As shown in FIG. 1, the ink-jet recording apparatus 101 of this embodiment carries a line type ink-jet head. The apparatus is constructed such that the surface treatment solution is applied to the recording surface of the recording paper P in accordance with the ink-jet system. As shown in the drawing, the ink-jet recording apparatus 101 includes, as main constitutive elements, one cartridge 1' which is usable for the surface treatment solution, four ink cartridges 1, one head 2' which is usable for the surface treatment solution, four ink-jet heads 2, a paper feed section 11, a paper discharge section 12, a belt transport mechanism 13, and a control unit 16 which controls the entire ink-jet recording apparatus 101. The surface treatment solution cartridge 1' and the ink cartridges 1 are constructed identically. Similarly, the surface treatment solution head 2' and the ink-jet heads 2 are constructed identically. The paper feed section 11 is arranged on one side of the belt transport mechanism 13 (on the left side as viewed in the drawing). The paper discharge section 12 is arranged on the other side of the belt transport mechanism 13 (on the right side in the drawing).

A recording paper transport passage is formed in the ink-jet recording apparatus 101, along which the recording paper P is transported from the paper feed section 11 to the paper discharge section 12 by the aid of the belt transport mechanism 13. The arrow X indicates the recording paper transport direction in which the recording paper P is transported. For example, those conventionally known can be used for the paper feed section 11, the belt transport mechanism 13, and the paper discharge section 12 (see, for example, Japanese Patent Application Laid-open No. 2007-326242). In FIG. 1, reference numeral 59 indicates a recording paper detection sensor which detects whether or not the recording paper P, which is fed from the paper feed section 11, arrives at the recording waiting position positioned just on the upstream side (left side in the drawing) of the belt transport mechanism 13 in the recording paper transport direction X.

In FIG. 1, reference numeral 4 indicates a nip roller which is provided to press the recording paper P against the outer circumferential surface 13a of the belt when the recording paper P, which is transported by the belt transport mechanism 13, is placed on the outer circumferential surface 13a of the belt of the belt transport mechanism 13. An exfoliating mechanism 14 is provided just on the downstream side of the belt transport mechanism 13. The exfoliating mechanism 14 is constructed such that the recording paper P, which is stuck to the outer circumferential surface 13a of the belt, is exfoliated from the outer circumferential surface 13 of the belt, and the recording paper P is fed to the paper discharge section 12.

The surface treatment solution cartridge 1' includes the surface treatment solution of the first embodiment. The four ink cartridges 1 include four color water-based inks of yellow, magenta, cyan, and black one by one respectively. The surface treatment solution cartridge 1' and the four ink cartridges 1 are fixed while being aligned over or above the belt transport mechanism 13 in the recording paper transport direction X. Each of the surface treatment solution cartridge 1' and the four ink cartridges 1 has each of the surface treatment solution head 2' and the ink jet heads 2 disposed at the lower end thereof. When the recording paper P, which is transported by the belt transport mechanism 13, is allowed to pass along the position disposed just under the surface treatment solution head 2', the surface treatment solution is firstly discharged from the surface treatment solution discharge surface 2a' toward the recording surface of the recording paper P. Subsequently, when the recording paper P, which is transported by the belt transport mechanism 13, is allowed to successively pass along the positions disposed just under the four ink-jet heads 2, the ink droplets of the respective colors are discharged from the ink discharge surfaces 2a. Accordingly, the recording can be performed on the recording surface of the recording paper P.

Figure 2:
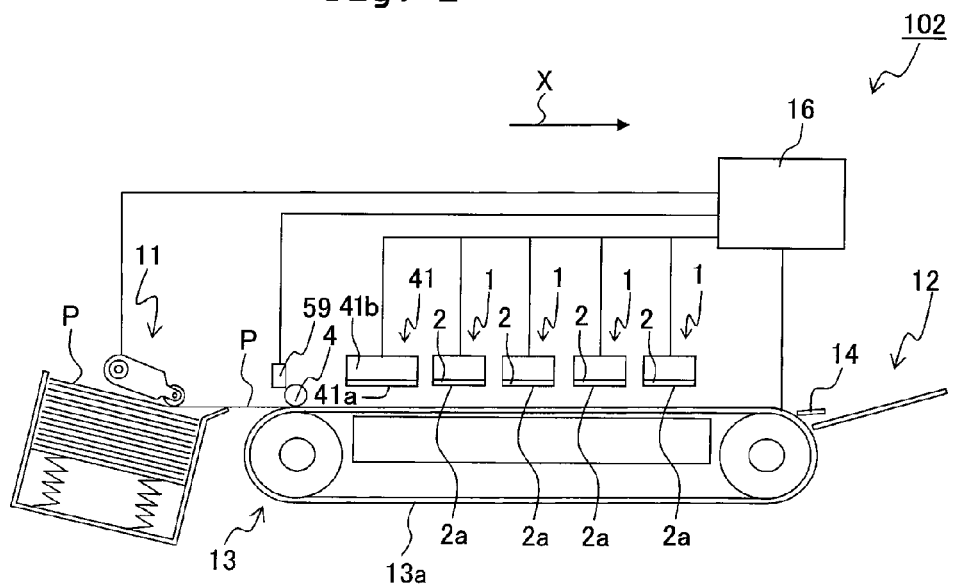
FIG. 2 shows an arrangement illustrating an exemplary structure of an ink jet recording apparatus in relation to a fourth embodiment.

An ink jet recording apparatus, which is constructed differently from the third embodiment, will be explained as a fourth embodiment. In FIG. 2, the components or parts, which are the same as those shown in FIG. 1, are designated by the same reference numerals. The ink-jet recording apparatus 102 of this embodiment is constructed such that the surface treatment solution is applied to the recording surface of the recording paper P by the stamp application. Therefore, the ink-jet recording apparatus 102 of this embodiment is not provided with the mechanism for applying the surface treatment solution in accordance with the ink jet system (surface treatment solution cartridge 1', surface treatment solution head 2', and surface treatment solution discharge surface 2a' shown in FIG. 1). Other than the above, the ink jet recording apparatus 102 of this embodiment is constructed in the same manner as the apparatus shown in FIG. 1 described above.

As shown in FIG. 2, the ink-jet recording apparatus 102 of this embodiment has a stamp (stamper) 41 which is arranged at the positions of the surface treatment solution cartridge 1', the surface treatment solution head 2', and the surface treatment solution discharge surface 2a' shown in FIG. 1. The stamp 41 includes a stamp section 41a and a surface treatment solution accommodating section 41b. The stamp section 41a is formed of a highly liquid-absorptive base material having the flexibility. When the recording is performed, then the stamp section 41a is brought in contact with the recording surface of the recording paper P, and the surface treatment solution, which is supplied from the surface treatment solution accommodating section 41b, is applied to the recording surface of the recording paper P.

In the apparatuses shown in FIGS. 1 and 2, the surface treatment solution is applied to the recording surface of the recording paper P in accordance with the ink jet system and the stamp application. However, the third and fourth embodiments are not limited thereto. The ink-jet recording apparatus may be based on such a system that the surface treatment solution is applied to the recording surface of the recording paper P, for example, in accordance with the system of brush application or roller application. The apparatuses shown in FIGS. 1 and 2 adopt the line type ink jet head. However, the third and fourth embodiments are not limited thereto. It is also allowable to use an apparatus which adopts the serial type ink-jet.

An ink jet recording method will be explained as a fifth embodiment. The ink-jet recording method of this embodiment can be carried out by using, for example, any one of the ink-jet recording apparatuses of the third and fourth embodiments.

As described above, the ink jet recording method of this embodiment resides in an ink jet recording method including a recording paper surface treatment step of applying the surface treatment solution to the recording paper, and a recording step of performing the recording by discharging the water-based ink to the recording paper in accordance with an ink-jet system, wherein the surface treatment solution of the first embodiment is used as the surface treatment solution to be used in the surface treatment step.

The surface treatment step described above is preferably a pretreatment step of the ink-jet recording wherein the surface treatment solution is applied to the recording paper prior to the ink-jet recording.

In the surface treatment step described above, the application of the surface treatment solution can be carried out by the method including, for example, the ink-jet system, the stamp application, the brush application, and the roller application. The ink-jet system resides in, for example, such a system that the application is performed by discharging the surface treatment solution to the recording paper. The stamp application, the brush application, and the roller application reside in such systems that the application is performed by using the stamp (stamper), the brush, and the roller respectively as denoted by the names thereof.

Figure 3A:
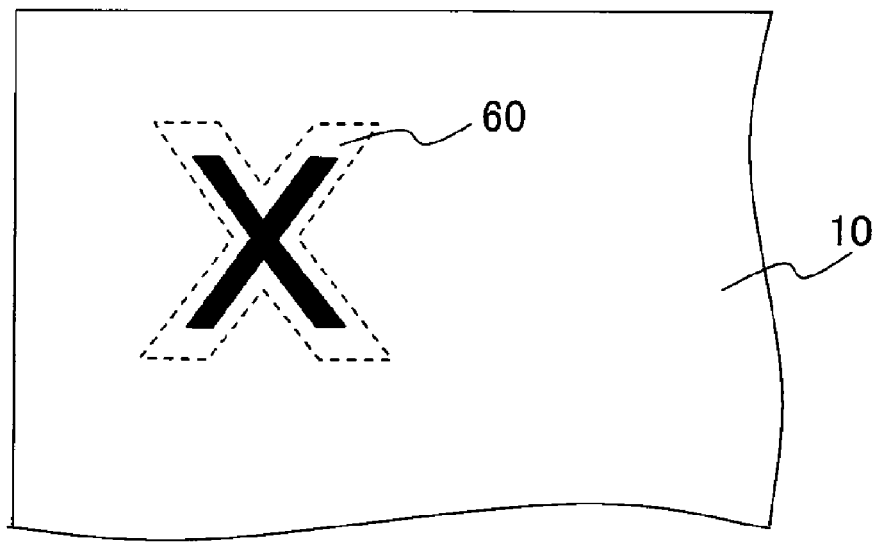
FIGS. 3A and 3B show examples of recording performed in accordance with an ink jet recording method in relation to a fifth embodiment.
Figure 3B:
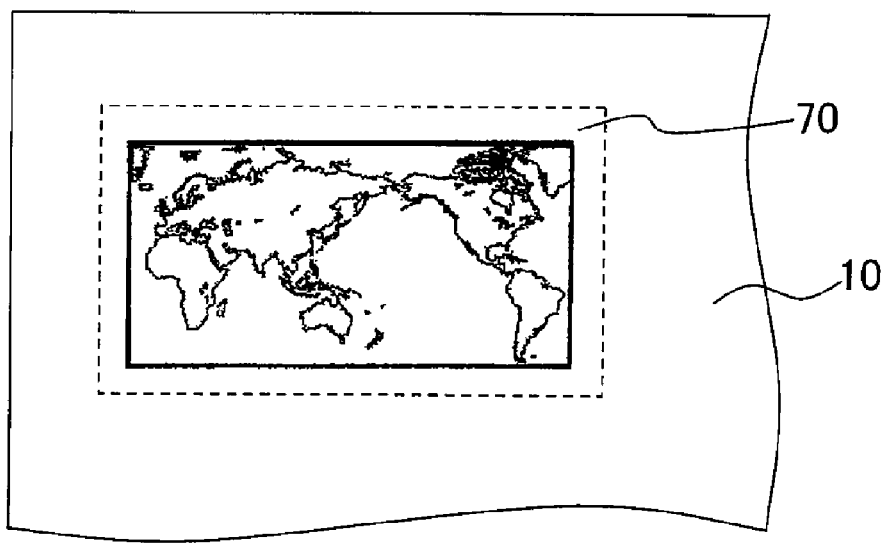

In the surface treatment step described above, the surface treatment solution may be applied to the entire surface of the recording surface of the recording paper or a part of the recording surface of the recording paper. When the surface treatment solution is applied to a part of the recording surface, the applied area is at least an area of the recording surface of the recording paper which is scheduled to be subjected to the recording with the water-based ink (recording-scheduled area). When the surface treatment solution is applied to a part of the recording surface, the size of the applied area is appropriately larger than the area scheduled to be subjected to the recording (recording-scheduled area). For example, as shown in FIG. 3A, when the letter "X" is recorded on the recording paper 10, it is preferable that the surface treatment solution is applied to form an applied area 60 with a line width larger than a line width of the letter. On the other hand, as shown in FIG. 3B, when a pattern is recorded on the recording paper 10, it is preferable that the surface treatment solution is applied to form an applied area 70 larger than the pattern. In other words, in the application of the surface treatment solution in the surface treatment step, it is preferable that the application is performed for the area which is overlapped with the recording area (discharge area) of the water-based ink on the recording paper and which is wider than the recorded area of the water-based ink.

Subsequently, in the recording step described above, the recording is performed by discharging the water-based ink to the applied area of the recording surface of the recording paper by the ink jet system. As described above, it is prefer-able that the recording step is performed after the surface treatment step. Further, it is preferable that the recording step is carried out before drying the surface treatment solution applied to the recording paper in the surface treatment step, for the following reason. That is, it is intended to easily effect the reaction between the coloring agent contained in the water-based ink and calcium alginate and sodium alginate contained in the surface treatment solution.

Those usable as the water-based ink to be used for the recording step include, for example, the water-based inks of the ink set of the second embodiment.

The ink-jet recording, which is to be performed in the recording step, can be carried out by discharging the water-based ink to the recording paper by using the ink-jet head.

Figure 4A:
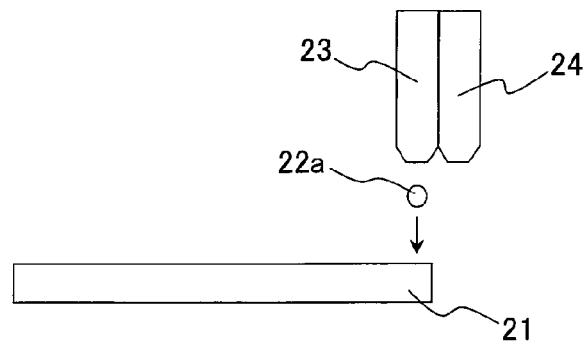
FIGS. 4A to 4D show exemplary steps of the ink-jet recording method in relation to the fifth embodiment.
Figure 4B:
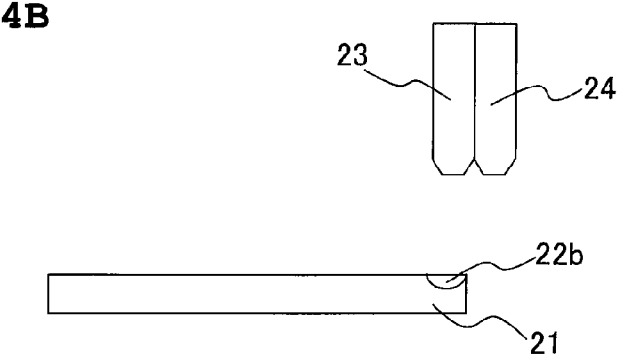
Figure 4C:
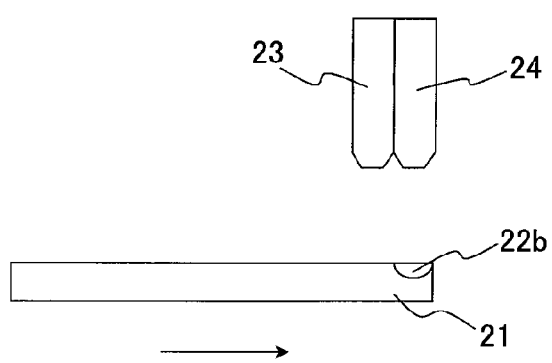
Figure 4D:
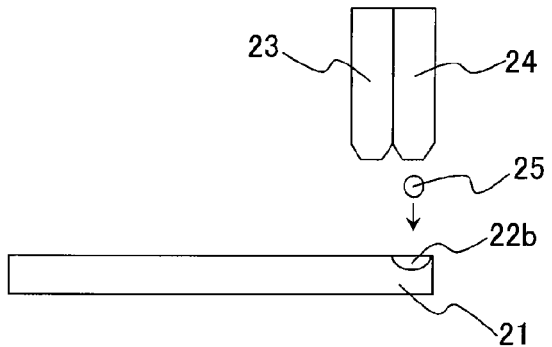
Figure 9:
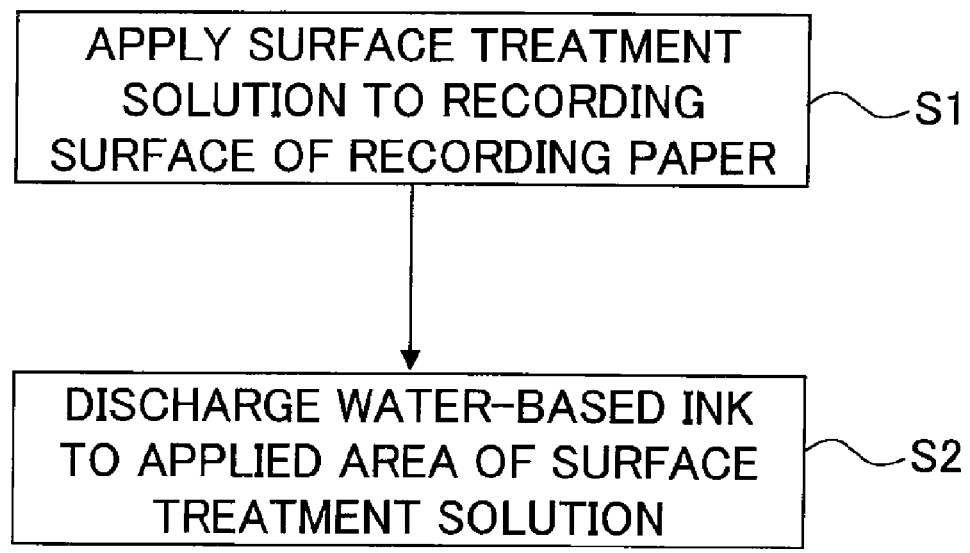
FIG. 9 shows a flow chart illustrating an exemplary ink jet recording method in relation to the fifth embodiment.

An example of the ink-jet recording method of the embodiment will be explained with reference to FIGS. 4 and 9. At first, the surface treatment solution 22a is discharged from the nozzle 23 of the ink jet head to the recording-scheduled area of the recording surface of the recording paper 21 to apply the surface treatment solution 22a as shown in FIG. 4A, and the applied area 22b of the surface treatment solution is formed as shown in FIG. 4B (Step S1). Subsequently, as shown in FIG. 4C, the recording paper 21 is moved in the direction of the arrow. Subsequently, as shown in FIG. 4D, the water-based ink 25 is discharged to the applied area 22b by using the nozzle 24 of the ink jet head to perform the recording (Step S2).

EXAMPLES

Next, Examples of the present invention will be explained together with Comparative Examples. The present invention is neither limited to nor restricted by Examples and Comparative Examples described below.

Preparation of Surface Treatment Solution

Surface treatment solution compositions (Tables 1 and 2) were mixed uniformly or homogeneously to obtain surface treatment solutions 1 to 27.

Preparation of Water-Based Inks A to C and E

Components of water-based ink compositions (Table 3) except for self-dispersible pigments (CAB-O-JET (trade name) 300 and 260M) were mixed uniformly or homogeneously to obtain ink solvents. Subsequently, the ink solvents were gradually added to the self-dispersible pigments, and they were mixed uniformly or homogeneously. After that, obtained mixtures were filtrated through a membrane filter (pore size 3.00 μm) of the cellulose acetate type produced by Toyo Roshi Kaisha, Ltd., and thus water-based inks for ink jet recording A to C and E were obtained.

Preparation of Water-Based Ink D 12 parts by weight of carbon black (MA 100), 6 parts by weight of high molecular weight pigment dispersing agent (DISPERBYK (trade name)-190), 12 parts by weight of glycerol, and 70 parts by weight of water were mixed with each other, and then the dispersing treatment was performed with a wet sand mill by using zirconia beads having a diameter of 0.3 mm as a medium to obtain a carbon black dispersion. Further, 18 parts by weight of water, 29 parts by weight of glycerol, 2 parts by weight of dipropylene glycol n-propyl ether, and 1 part by weight of sodium polyoxyethylene lauryl ether sulfate were mixed with each other to prepare 50 parts by weight of an ink solvent. After that, 50 parts by weight of the prepared ink solvent were gradually added to 50 parts by weight of the agitating carbon black dispersion, followed by being further agitated for 30 minutes. After that, a water-based ink for ink jet recording D was obtained by performing the filtration through a membrane filter (pore size 3.00 μm) of the cellulose acetate type produced by Toyo Roshi Kaisha, Ltd.

TABLE 1

|  | Surface treatment solution | | | | | | |
|---|---|---|---|---|---|---|---|
|  | 1 | 2 | 3 | 4 | 5 | 6 | 7 |
| Calcium alginate | 0.040 | 0.060 | 0.064 | 0.074 | 0.060 | 0.044 | 0.016 |
| Sodium alginate | 0.036 | 0.060 | 0.036 | 0.026 | 0.084 | 0.084 | 0.084 |
| DPP (*1) | 10.0 | 10.0 | 10.0 | 10.0 | 10.0 | 10.0 | 10.0 |
| DEHE (*2) | — | — | — | — | — | — | — |
| BTG (*3) | — | — | — | — | — | — | — |
| DPG (*4) | 10.0 | 10.0 | 10.0 | 10.0 | 10.0 | 10.0 | 10.0 |
| Water | balance | balance | balance | balance | balance | balance | balance |

|  | Surface treatment solution | | | | | | |
|---|---|---|---|---|---|---|---|
|  | 8 | 9 | 10 | 11 | 12 | 13 | 14 |
| Calcium alginate | 0.008 | 0.008 | 0.010 | 0.032 | 0.037 | 0.040 | 0.040 |
| Sodium alginate | 0.070 | 0.042 | 0.015 | 0.018 | 0.013 | 0.036 | 0.036 |
| DPP (*1) | 10.0 | 10.0 | 10.0 | 10.0 | 10.0 | — | — |
| DEHE (*2) | — | — | — | — | — | 10.0 | — |
| BTG (*3) | — | — | — | — | — | — | 10.0 |
| DPG (*4) | 10.0 | 10.0 | 10.0 | 10.0 | 10.0 | 10.0 | 10.0 |
| Water | balance | balance | balance | balance | balance | balance | balance |

(*1): DPP = dipropylene glycol n-propyl ether
(*2): DEHE = diethylene glycol n-hexyl ether
(*3): BTG = triethylene glycol n-butyl ether
(*4): DPG = dipropylene glycol
Unit of blending amount: % by weight.

TABLE 2

|  | Surface treatment solution | | | | | | |
|---|---|---|---|---|---|---|---|
|  | 15 | 16 | 17 | 18 | 19 | 20 | 21 |
| Calcium alginate | 0.078 | 0.081 | 0.086 | 0.099 | 0.100 | 0.128 | 0.090 |
| Sodium alginate | 0.022 | 0.029 | 0.014 | 0.002 | — | 0.072 | 0.070 |
| DPP (*1) | 10.0 | 10.0 | 10.0 | 10.0 | 10.0 | 10.0 | 10.0 |
| DPG (*4) | 10.0 | 10.0 | 10.0 | 10.0 | 10.0 | 10.0 | 10.0 |
| Water | balance | balance | balance | balance | balance | balance | balance |

|  | Surface treatment solution | | | | | |
|---|---|---|---|---|---|---|
|  | 22 | 23 | 24 | 25 | 26 | 27 |
| Calcium alginate | 0.018 | 0.008 | — | 0.006 | 0.006 | 0.030 |
| Sodium alginate | 0.092 | 0.092 | 0.100 | 0.034 | 0.004 | 0.010 |
| DPP (*1) | 10.0 | 10.0 | 10.0 | 10.0 | 10.0 | 10.0 |
| DPG (*4) | 10.0 | 10.0 | 10.0 | 10.0 | 10.0 | 10.0 |
| Water | balance | balance | balance | balance | balance | balance |

(*1): DPP = dipropylene glycol n-propyl ether
(*4): DPG = dipropylene glycol
Unit of blending amount: % by weight.

TABLE 3

|  | Water-based ink | | | | |
|---|---|---|---|---|---|
|  | A | B | C | D | E |
| CAB-O-JET (trade name) 300 (*5) | 40.0 (6.0) | 40.0 (6.0) | 40.0 (6.0) | — | — |
| CAB-O-JET (trade name) 260M (*6) | — | — | — | — | 50.0 (5.0) |
| MA 100 (*7) | — | — | — | 6.0 | — |
| Glycerol | 35.0 | 35.0 | 35.0 | 35.0 | 35.0 |
| DPP (*1) | 2.0 | — | — | 2.0 | 2.0 |
| DEHE (*2) | — | 1.0 | — | — | — |
| BTG (*3) | — | — | 5.0 | — | — |

TABLE 3-continued

| | Water-based ink | | | | |
|---|---|---|---|---|---|
| | A | B | C | D | E |
| Sodium polyoxyethylene lauryl ether sulfate (*8) | 1.0 | 1.0 | 1.0 | 1.0 | 1.0 |
| DISPERBYK (trade name) -190 (*9) | — | — | — | 3.0 | — |
| Water | balance | balance | balance | balance | balance |

(*1): DPP = dipropylene glycol n-propyl ether
(*2): DEHE = diethylene glycol n-hexyl ether
(*3): BTG = triethylene glycol n-butyl ether
(*5): self-dispersible pigment, produced by Cabot, pigment concentration = 15% by weight, parenthesized numerals indicate pigment solid content amounts;
(*6): self-dispersible pigment, produced by Cabot, pigment concentration = 10% by weight, parenthesized numerals indicate pigment solid content amounts;
(*7): carbon black, produced by Mitsubishi Chemical Corporation
(*8): oxyethylene average polymerization degree = 12
(*9): high molecular weight pigment dispersing agent, produced by BYK Chemie
Unit of blending amount: % by weight.

Example 1

An ink set was obtained by combining the surface treatment solution 1 and the water-based ink A.

Examples 2 to 17

Ink sets were obtained by combining the surface treatment solutions described above and the water-based inks described above as shown in Table 4 in the same manner as in Example 1.

Comparative Example 1

An ink set was obtained by combining the surface treatment solution 15 and the water-based ink A.

Comparative Examples 2 to 16

Ink sets were obtained by combining the surface treatment solutions described above and the water-based inks described above as shown in Table 4 in the same manner as in Comparative Example 1.

The quick drying performance was measured and evaluated in accordance with the following methods in relation to Examples and Comparative Examples.

(a) First Quick Drying Performance Evaluation

Figure 5A:
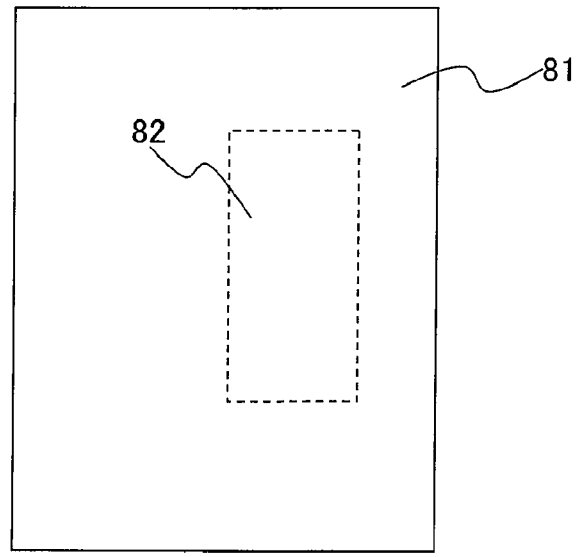
FIGS. 5A to 5C illustrate a first quick drying performance evaluation method in the examples.

The surface treatment solution of each of Examples and Comparative Examples was uniformly spread on an OHP film ("OHP film multiprint type GC 6000" produced by Sumitomo 3M Limited) by using a bar coater (Rod No. 8 of Bar Coater produced by Yasuda Seiki seisakusho LTD.). Subsequently, a stamp surface (40 mm×90 mm) of an unused electric stamp ("SS4090B" produced by Brother Industries, Ltd.) was pressed against the OHP film to allow the stamp surface to absorb the surface treatment solution. The absorption of the surface treatment solution to the stamp surface was adjusted so that the weight of the electric stamp was increased by about 1.0000 g (+1.0000 g) as compared with the weight before the absorption. Subsequently, the extra seal was stamped to perform the adjustment so that the weight of the paper, which was subjected to the stamping once, was increased by about 0.0040 g (+0.0040 g) as compared with the weight before the stamping. Subsequently, as shown in FIG. 5A, the stamping was performed on the recording surface of the recording paper 81 to form an applied area 82. Plain paper ("MAMMERMILL Laser Print 24 lb" produced by INTERNATIONAL PAPER) was used as the recording paper 81.

Figure 5B:
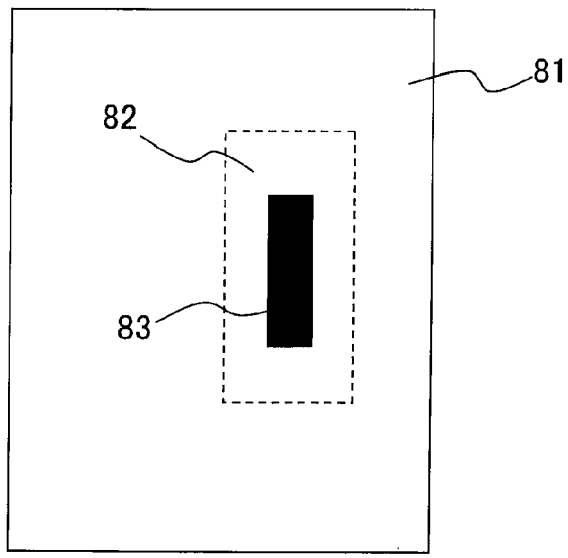
Figure 5C:
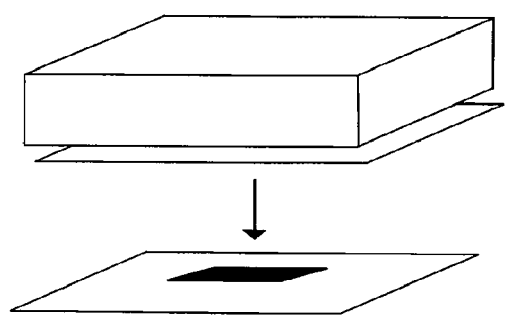

Subsequently, the water-based ink was charged into the ink cartridge of the ink-jet recording apparatus shown in FIG. 2, and the flashing (preliminary discharge) was performed by using the ink-jet recording apparatus. After that, as shown in FIG. 5B, the solid recording (printing) (70 mm×23 mm) of a coating ratio of 100% was performed at a resolution of 600 dpi×600 dpi by using the water-based ink on a part of the applied area 82, and thus a recorded area 83 was formed. Immediately after the recording (after 0.6 second), as shown in FIG. 5C, a bundle, which was composed of one sheet of the blank paper (plain paper described above) and 500 sheets of the plain paper described above, was placed on the recording surface. After that, the back surface of the blank paper was visually observed for every 3 seconds from distances of 10 to 15 cm and 30 to 40 cm from the paper surface, and the evaluation was made in accordance with the following evaluation criteria.

Evaluation Criteria for First Quick Drying Performance Evaluation

Figure 6A:
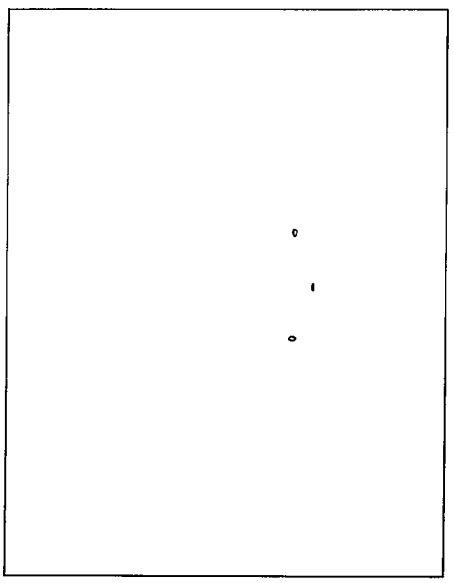
FIGS. 6A to 6D schematically show evaluation criteria of the first quick drying performance evaluation method in the examples.

A: The number of transfer traces visually observable from the distance of 10 to 15 cm from the paper surface was not more than three as shown in FIG. 6A, wherein the quick drying performance was remarkably improved as compared with Reference Example in which the surface treatment solution was not applied.

Figure 6B:
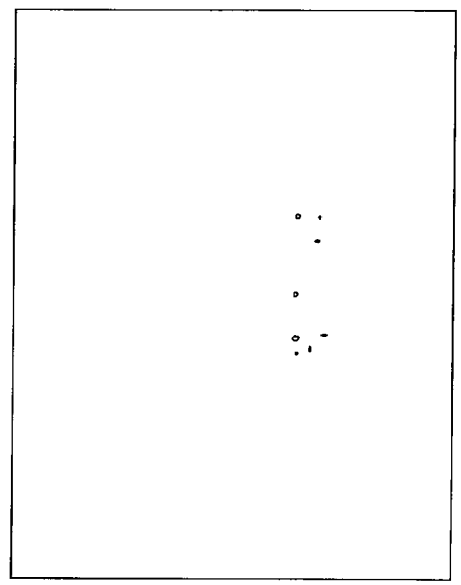

B: The number of transfer traces visually observable from the distance of 10 to 15 cm from the paper surface was not less than four as shown in FIG. 6B, but the number of obvious transfer traces visually observable from the distance of 30 to 40 cm from the paper surface was not more than three, wherein the quick drying performance was improved as compared with Reference Example described above.

Figure 6C:
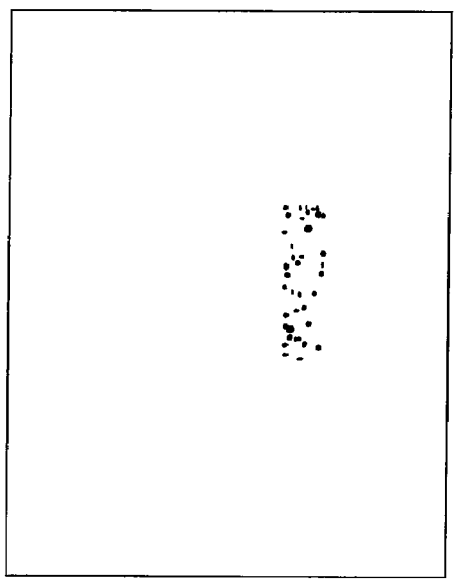

C: The number of transfer traces visually observable from the distance of 30 to 40 cm from the paper surface was not less than four as shown in FIG. 6C, and not less than the half of the contour of the recorded area 83 was capable of being visually observed, wherein the quick drying performance was equivalent to or less than that of Reference Example described above.

Figure 6D:
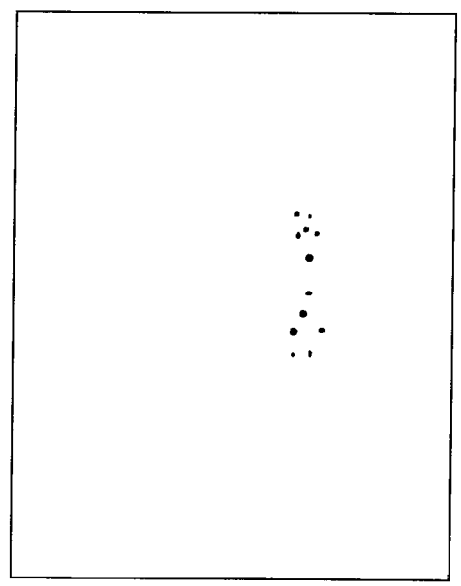

In all of five Reference Examples in which the water-based inks A to E were used as described above, the number of transfer traces visually observable from the distance of 10 to 15 cm from the paper surface was not less than four as shown in FIG. 6D, and the number of obvious transfer traces visually observable from the distance of 30 to 40 cm from the paper surface was not less than four.

(b) Second Quick Drying Performance Evaluation

Figure 7A:
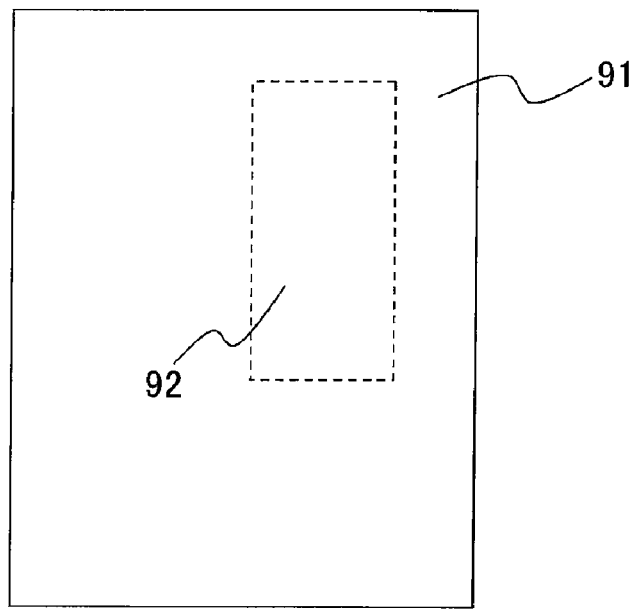
FIGS. 7A to 7C illustrate a second quick drying performance evaluation method in the examples.
Figure 7B:
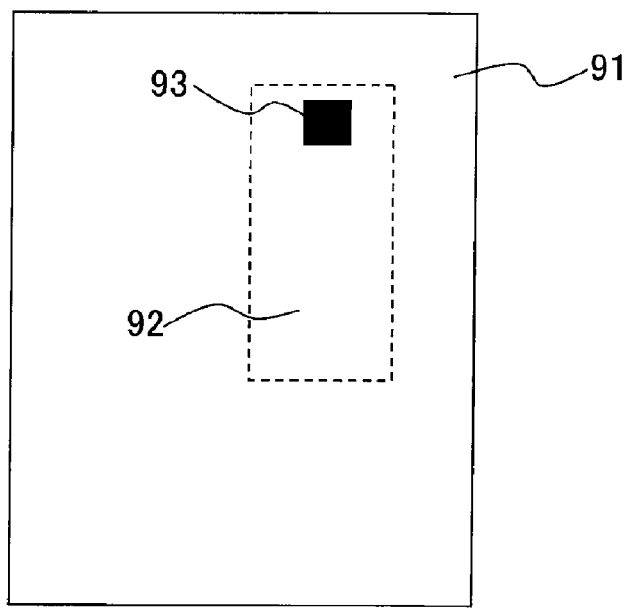
Figure 7C:
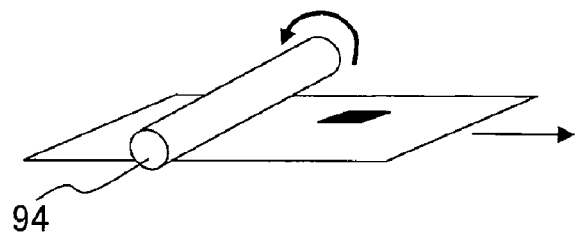

As shown in FIG. 7A, an applied area 92 was formed on the recording surface of the recording paper 91 in the same manner as in the first quick drying performance evaluation. Subsequently, as shown in FIG. 7B. a recorded area 93 was formed in the same manner as in the first quick drying performance evaluation except that the solid recording (printing) (23 mm×23 mm) was performed on a part of the applied area 92. Immediately after the recording (after 1.2 seconds), as shown in FIG. 7C, the recorded matter was transported by a roller 94 (diameter: 14 mm) made of ethylene propylene diene rubber (EPDM). After that, transfer traces on the recording surface, which were brought about by the transfer from the roller, were visually observed for every 3 seconds from distances of 10 to 15 cm and 30 to 40 cm from the paper surface, and the evaluation was made in accordance with the following evaluation criteria.

Evaluation Criteria for Second Quick Drying Performance Evaluation

Figure 8A:
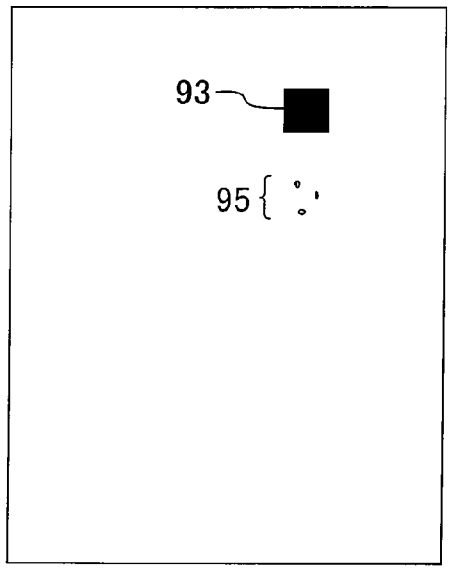
FIGS. 8A to 8D schematically show evaluation criteria of the second quick drying performance evaluation method in the examples.

A: The number of transfer traces visually observable from the distance of 10 to 15 cm from the paper surface was not more than three at a judgment portion 95 (transfer traces brought about by the first rotation of the roller) as shown in FIG. 8A, wherein the quick drying performance was remarkably improved as compared with Reference Example in which the surface treatment solution was not applied.

Figure 8B:
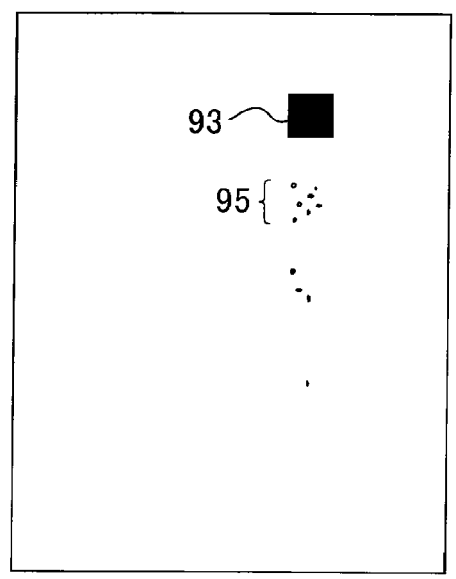

B: The number of transfer traces visually observable from the distance of 10 to 15 cm from the paper surface at the judgment portion 95 was not less than four as shown in FIG. 8B, but the number of obvious transfer traces visually observable from the distance of 30 to 40 cm from the paper surface was not more than three, wherein the quick drying performance was improved as compared with Reference Example described above.

Figure 8C:
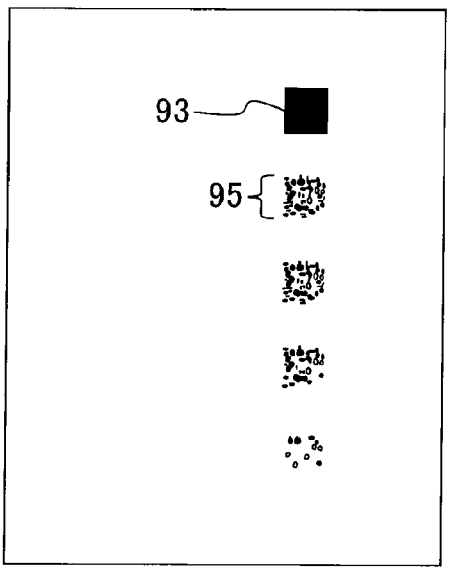

C: The number of transfer traces visually observable from the distance of 30 to 40 cm from the paper surface at the judgment portion 95 was not less than four as shown in FIG. 8C, and not less than the half of the contour of the recorded area 93 was capable of being visually observed, wherein the quick drying performance was equivalent to or less than that of Reference Example described above.

Figure 8D:
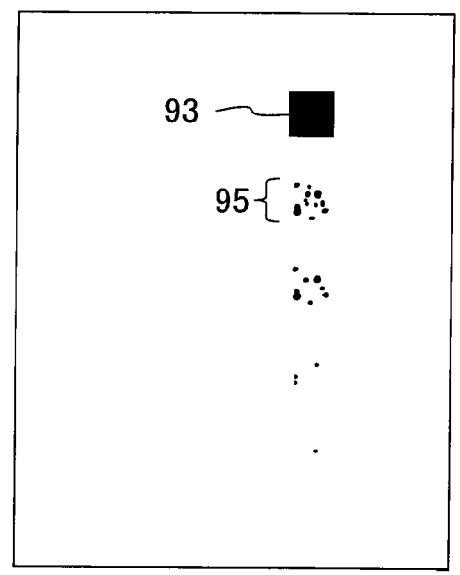

In all of five Reference Examples in which the water-based inks A to E were used as described above, the number of transfer traces visually observable from the distance of 10 to 15 cm from the paper surface at the judgment portion 95 was not less than four as shown in FIG. 8D, and the number of obvious transfer traces visually observable from the distance of 30 to 40 cm from the paper surface was not less than four.

(c) Value of Optical Density (OD)

An applied area was formed on the recording paper in the same manner as in the first quick drying performance evaluation described above. Subsequently, a recorded area was formed in the same manner as in the first quick drying performance evaluation described above on a part of the applied area. Reference Example was provided such that the recording was performed in accordance with the same ink jet system as that of Examples and Comparative Examples on the recording surface of the recording paper to which the surface treatment solution was not applied. The optical density (OD) value of the recorded area on the recording paper was measured by using a spectrophotometer Spectrolino (light source: $D_{50}$, field: 2°, filter: Status T) produced by Gretag Macbeth.

When the water-based ink A was used in Reference Example described above, the optical density (OD) value of the recorded area on the recording paper was 1.18 in Reference Example described above.

(d) Overall Evaluation

The overall evaluation was performed in accordance with the following evaluation criteria according to the results of (a) and (b) described above for the respective ink sets.

Evaluation Criteria for Overall Evaluation

G(A): Both of the results of (a) and (b) described above were "A", or any one of the results of (a) and (b) described above was "B".

G: Both of the results of (a) and (b) described above were "B".

NG: Any one of the results of (a) and (b) described above was "C".

Obtained evaluation results of Examples and Comparative Examples are shown in Table 4.

TABLE 4

|  | Surface treatment solution | Water-based ink | First quick drying performance | Second quick drying performance | Optical density (OD) value | Overall evaluation |
| --- | --- | --- | --- | --- | --- | --- |
| Example 1 | 1 | A | A | A | 1.20 | G(A) |
| Example 2 | 2 | A | B | A | 1.20 | G(A) |
| Example 3 | 3 | A | B | A | 1.20 | G(A) |
| Example 4 | 4 | A | B | B | 1.20 | G |
| Example 5 | 5 | A | B | A | 1.20 | G(A) |
| Example 6 | 6 | A | B | A | 1.20 | G(A) |
| Example 7 | 7 | A | B | B | 1.19 | G |
| Example 8 | 8 | A | B | B | 1.19 | G |
| Example 9 | 9 | A | B | B | 1.19 | G |
| Example 10 | 10 | A | B | B | 1.19 | G |
| Example 11 | 11 | A | B | B | 1.19 | G |
| Example 12 | 12 | A | B | B | 1.19 | G |
| Example 13 | 13 | A | A | A | 1.20 | G(A) |
| Example 14 | 14 | A | A | A | 1.20 | G(A) |
| Example 15 | 3 | C | B | A | 1.20 | G(A) |
| Example 16 | 6 | D | B | A | 1.20 | G(A) |
| Example 17 | 7 | E | B | B | 1.19 | G |
| Comp. Ex. 1 | 15 | A | C | B | 1.20 | NG |
| Comp. Ex. 2 | 16 | A | C | B | 1.20 | NG |
| Comp. Ex. 3 | 17 | A | C | C | 1.20 | NG |

TABLE 4-continued

|  | Surface treatment solution | Water-based ink | First quick drying performance | Second quick drying performance | Optical density (OD) value | Overall evaluation |
|---|---|---|---|---|---|---|
| Comp. Ex. 4 | 18 | A | C | C | 1.19 | NG |
| Comp. Ex. 5 | 19 | A | C | C | 1.19 | NG |
| Comp. Ex. 6 | 20 | A | C | C | 1.20 | NG |
| Comp. Ex. 7 | 21 | A | C | C | 1.20 | NG |
| Comp. Ex. 8 | 22 | A | C | C | 1.19 | NG |
| Comp. Ex. 9 | 23 | A | C | C | 1.19 | NG |
| Comp. Ex. 10 | 24 | A | C | C | 1.18 | NG |
| Comp. Ex. 11 | 25 | A | C | C | 1.18 | NG |
| Comp. Ex. 12 | 26 | A | C | C | 1.18 | NG |
| Comp. Ex. 13 | 27 | A | C | C | 1.19 | NG |
| Comp. Ex. 14 | 15 | B | C | C | 1.20 | NG |
| Comp. Ex. 15 | 22 | D | C | C | 1.19 | NG |
| Comp. Ex. 16 | 25 | E | C | C | 1.18 | NG |

As shown in Table 4, the results of the quick drying performance evaluation were satisfactory in Examples based on the use of the surface treatment solutions 1 to 14 in which the blending amount of calcium alginate was 0.008% by weight to 0.074% by weight and the blending amount of sodium alginate was 0.013% by weight to 0.084% by weight. The results of the quick drying performance evaluation were especially satisfactory in Examples 1 to 3, 5, 6, and 13 to 16 based on the use of the surface treatment solutions 1 to 3, 5, 6, 13, and 14 in which the blending amount of calcium alginate was 0.04% by weight to 0.064% by weight. The decrease in the optical density was not observed in all of Examples.

On the other hand, the results of the quick drying performance evaluation were inferior in Comparative Examples based on the use of the surface treatment solutions 15 to 27 in which at least one of the blending amounts of calcium alginate and sodium alginate was not within the predetermined range described above.

In the examples, the water-based ink is subjected to the ink jet recording after applying the surface treatment solution to the recording paper. However, the order of the procedure may be reversed such that the surface treatment solution is applied after performing the ink jet recording with the water-based ink on the recording paper.

What is claimed is:

1. A surface treatment solution for a recording paper on which ink-jet recording is performed with a water-based ink, the surface treatment solution comprising;
   calcium alginate which is contained by 0.008 wt % to 0.074 wt % in the surface treatment solution,
   sodium alginate which is contained by 0.013 wt % to 0.084 wt % in the surface treatment solution,
   a water-soluble organic solvent, and
   water.

2. The surface treatment solution according to claim 1, wherein the calcium alginate is contained by 0.04 wt % to 0.064 wt % in the surface treatment solution.

3. The surface treatment solution according to claim 1, wherein the water-soluble organic solvent is selected from the group consisting of dipropylene glycol n-propyl ether, diethylene glycol n-hexyl ether, and triethylene glycol n-butyl ether.

4. The surface treatment solution according to claim 1, wherein the surface treatment solution is a pretreatment solution, for the ink jet recording, which is applied to the recording paper prior to the ink jet recording.

5. The surface treatment solution according to claim 1, wherein the recording paper is a plain paper.

6. The surface treatment solution according to claim 1, wherein the water-based ink contains a pigment.

7. An ink set comprising:
   a water-based ink which is subjected to ink jet recording on a recording paper; and
   a surface treatment solution which is applied to the recording paper,
   wherein the surface treatment solution contains;
      calcium alginate which is contained by 0.008 wt % to 0.074 wt % in the surface treatment solution,
      sodium alginate which is contained by 0.013 wt % to 0.084 wt % in the surface treatment solution,
      a water-soluble organic solvent, and
      water.

8. The ink set according to claim 7, wherein the water-based ink contains a pigment.

9. The ink set according to claim 7, wherein the surface treatment solution is a pretreatment solution, for the ink jet recording, which is applied to the recording paper prior to the ink-jet recording.

10. The ink set according to claim 7, wherein the recording paper is a plain paper.

11. An ink jet recording method comprising:
   applying a surface treatment solution to a recording paper to be subjected to ink-jet recording with a water-based ink; and
   discharging the water-based ink to the recording paper in accordance with an ink-jet system,
   wherein the applying uses, as the surface treatment solution, a surface treatment solution which contains;
      calcium alginate which is contained by 0.008 wt % to 0.074 wt % in the surface treatment solution,
      sodium alginate is contained by 0.013 wt % to 0.084 wt % in the surface treatment solution,
      a water-soluble organic solvent, and
      water.

12. The ink jet recording method according to claim 11, wherein the applying of the surface treatment solution includes applying the surface treatment solution only to a part of the recording paper.

13. The ink jet recording method according to claim 11, wherein the applying of the surface treatment solution includes applying the surface treatment solution to an area which is overlapped with a discharge area of the recording paper to which the water-based ink is discharged and which is wider than the discharge area.

14. The ink jet recording method according to claim 11, wherein the applying of the surface treatment solution is performed before the discharging of the water-based ink.

15. The ink jet recording method according to claim 14, wherein the discharging of the water-based ink is performed before the surface treatment solution applied to the recording paper is dried.

16. The ink-jet recording method according to claim 11, wherein the applying of the surface treatment solution includes discharging the surface treatment solution to the recording paper in accordance with an ink-jet system or stamp-applying the surface treatment solution to the recording paper.

17. The ink-jet recording method according to claim 11, wherein the recording paper is a plain paper.

18. An ink-jet recording apparatus comprising:
an ink accommodating section which accommodates a water-based ink;
a head which discharges the water-based ink to a recording paper;
a surface treatment solution accommodating section which accommodates a surface treatment solution for the recording paper; and
an applying mechanism which applies the surface treatment solution to the recording paper,
wherein the surface treatment solution is the surface treatment solution as defined in claim 1.

* * * * *

UNITED STATES PATENT AND TRADEMARK OFFICE
CERTIFICATE OF CORRECTION

PATENT NO. : 8,282,718 B2
APPLICATION NO. : 12/728851
DATED : October 9, 2012
INVENTOR(S) : Hideji Fukaya et al.

Page 1 of 1

It is certified that error appears in the above-identified patent and that said Letters Patent is hereby corrected as shown below:

In the Claims

Column 22, Claim 18, Line 2:
    Please delete "accommodates" insert -- includes --

Column 22, Claim 18, Line 7:
    Please delete "accommodates" insert -- includes --

Signed and Sealed this
Thirteenth Day of August, 2013

Teresa Stanek Rea
*Acting Director of the United States Patent and Trademark Office*